United States Patent
Tateishi (10) Patent No.: US 6,812,676 B2
(45) Date of Patent: Nov. 2, 2004

(54) DC-DC CONVERTER AND CONTROLLER FOR DC-DC CONVERTER

(75) Inventor: Tetsuo Tateishi, Warwick, RI (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/615,256

(22) Filed: Jul. 8, 2003

(65) Prior Publication Data

US 2004/0085048 A1 May 6, 2004

(30) Foreign Application Priority Data

Jul. 8, 2002 (JP) ........................................ 2002-199223

(51) Int. Cl.[7] .............................................. G05F 1/613
(52) U.S. Cl. ...................................... 323/225; 323/283
(58) Field of Search ................................. 323/225, 283, 323/282, 284

(56) References Cited

U.S. PATENT DOCUMENTS 6,320,358 B2 * 11/2001 Miller ........................ 323/222

* cited by examiner

Primary Examiner—Shawn Riley
(74) Attorney, Agent, or Firm—Frederick J. Telecky, Jr.; W. James Brady, III

(57) ABSTRACT

A DC—DC converter prevents reverse current from flowing through the inductor, suppresses ringing noise in the low-load state, lowers the power consumption, and increases the conversion efficiency. In the DC—DC converter composed of switches S1–S4 and inductor L1, in switching controller 10, output voltage $V_{out}$ and current $I_L$ in inductor L1 are detected, and in accordance with the detection result, switches S1–S4 are turned on/off so that output voltage $V_{out}$ is held at desired level; also, when the current in inductor L1 is nearly zero, switches S2 and S3 are turned on, and switch S4 on the output side of inductor L1 is turned off, so that reverse current flow through the inductor can be prevented, and the generation of ringing noise can be suppressed.

9 Claims, 5 Drawing Sheets

DC-DC CONVERTER AND CONTROLLER FOR DC-DC CONVERTER

FIELD OF THE INVENTION

The present invention pertains to a DC—DC converter that supplies a prescribed voltage to a load circuit corresponding to the supplied power source voltage.

BACKGROUND OF THE INVENTION

A DC—DC converter is usually used in order to convert a DC voltage supplied from a power source to a desired voltage that is different from the power source voltage. The DC—DC converter is composed of switching elements and an inductive element. When the switching elements are turned on/off, current flows in the inductive element, and, as a result, the stored energy is supplied to the load side. By controlling the on/off timing of the switching elements, it is possible to supply the desired voltage that is different from the power source voltage to the load.

Figure 8:
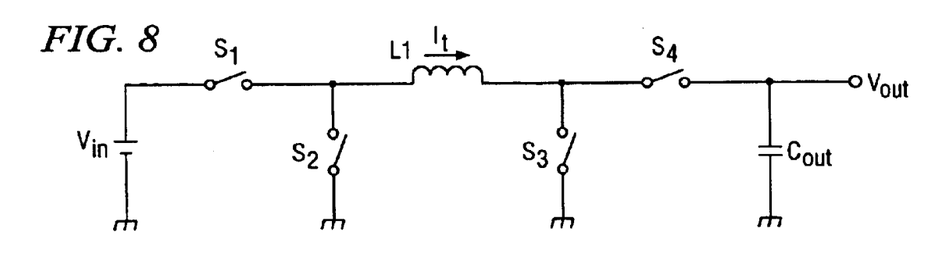
FIG. 8 is a diagram illustrating the constitution of an example of the conventional DC—DC converter.

FIG. 8 is a diagram illustrating the constitution of an example of a conventional DC—DC converter. The DC—DC converter shown in this figure is composed of switching elements (hereinafter referred to as switches) S1, S2, S3, S4, inductive element L1, and load capacitor $C_{out}$. For example, inductive element L1 may be a coil or the like. In the following, it will simply be referred to as inductor L1.

By means of a controller not shown in the figure, switches S1–S4 are controlled to turn on/off. For the DC—DC converter shown in FIG. 8, there are two operating states, state 1 and state 2. These operating states will be explained below.

In state 1, switches S1 and S3 are kept on, and switches S2 and S4 are kept off. In this case, as power source voltage $V_{in}$ is applied across inductor L1, current flows from the power source voltage supply terminal in the path through switch S1, inductor L1, and switch S3. Thus, energy is stored in inductor L1.

Then, in state 2, switches S1 and S3 are kept off, and switches S2 and S4 are kept on. As a result, the energy stored in inductor L1 in state 1 is released through switch S4 to the load circuit.

By means of the controller, for example, switches S1–S4 are turned on/off at a prescribed timing corresponding to a prescribed clock signal, and said state 1 and state 2 are entered repeatedly. By controlling the time ratio of state 1 and state 2 by means of a clock signal, one can supply a voltage higher or lower than power source voltage $V_{in}$ to the load circuit. Thus, the DC—DC converter shown in FIG. 8 is also known as up/down converter. Because switches S2 and S4 are only required to have a rectifying effect, switches S2 and S4 may be made up of diodes. However, in this case, electric power losses occur due to the forward voltage drop of the diode. When high efficiency is required, all of switches S1, S2, S3, S4 are all MOSFETs or other transistor elements, and the system is known as synchronized rectifying system.

Said DC—DC converter can be either a boost converter or a buck inverter, which supplies the desired stable voltage to the load circuit. In addition, since the circuit can be formed in a small size, it is now widely used.

However, when the DC—DC converter of the aforementioned synchronized rectifying system is operated at low loads, the inductor draws current from the output side, that is, the current flows backwards in the inductor. This will be explained below with reference to the inductor current $I_L$ waveform.

Figure 9A:
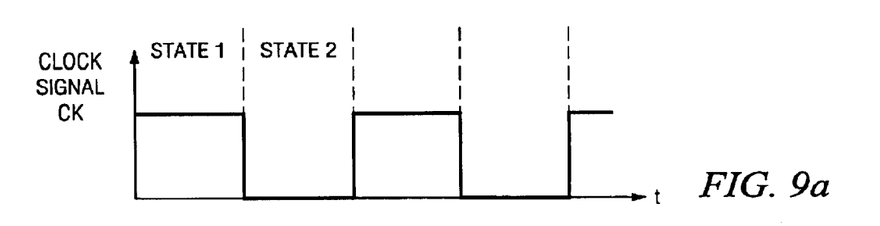
FIG. 9 is a waveform diagram illustrating the inductor current in the aforementioned DC—DC converter.
Figure 9B:
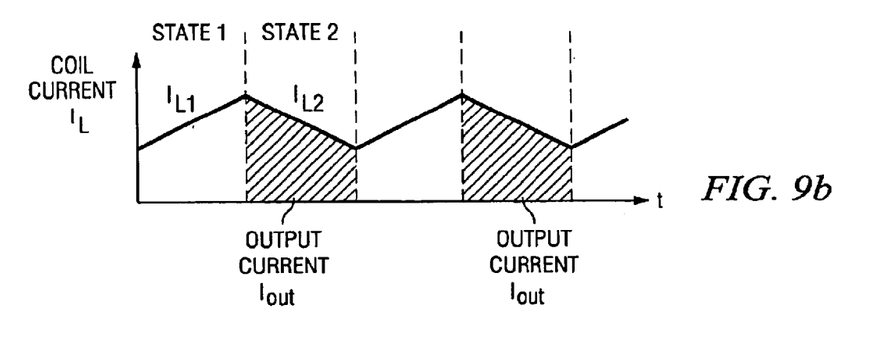

FIG. 9 illustrates the waveforms in an example of the current flowing through a coil. FIG. 9(a) shows the waveform of the clock signal for controlling the on/off timing of switches S1–S4. FIG. 9(b) shows current $I_L$ through inductor L1.

In this case, for example, it is assumed that the controller sets the DC—DC converter in state 1 when the clock signal is at the high level, and sets the DC—DC converter in state 2 when the clock signal is at the lower level. Consequently, in state 1, power source voltage $V_{in}$ applied across inductor L1, so that current $I_L$ of inductor L1 rises at a rate of $V_{in}/L$. Here, L represents the inductance of inductor L1. As shown in FIG. 9(b), in state 1, current $I_{L1}$ through inductor L1 rises at a rate of $V_{in}/L$.

Then, in state 2, the energy stored in inductor L1 is released to the load circuit. In this case, because output voltage $V_{out}$ is applied across inductor L1, current $I_{L2}$ in inductor L1 falls at a rate of $V_{out}/L$.

For inductor L1, as current is supplied to the load side in state 2, as shown in FIG. 9(b), by taking average for current $I_{L2}$ of state 2 in one period of the clock signal, one can determine current $I_{out}$ supplied by the DC—DC converter to the load circuit.

In the following, the low-load state will be explained. In the low-load state, in state 2, current $I_{L2}$ output from inductor L1 to the load circuit decreases. When the current drops below zero, reverse current flows from the load circuit to inductor L1. That is, the DC—DC converter sinks current from the load.

Figure 10:
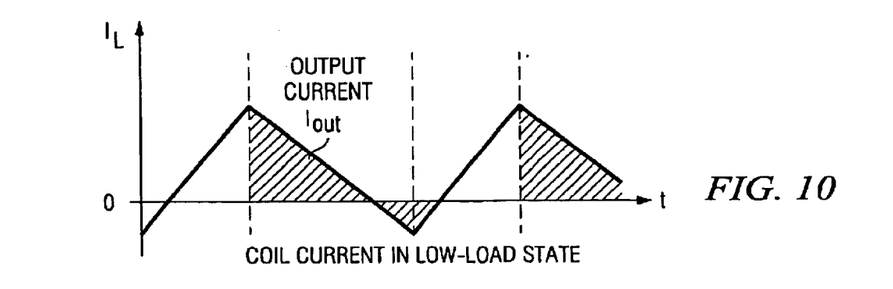
FIG. 10 is a waveform diagram illustrating the inductor current of the conventional DC—DC converter in the low-load state.

FIG. 10 is a waveform illustrating the current through inductor L1 in the low-load state.

As can be seen from this figure, in state 2, the current through inductor L1 falls gradually, and finally becomes negative.

In the low-load state, as reverse current flows through inductor L1, ringing occurs. As a result, an undesirable energy transfer takes place between the input and output, and the conversion efficiency of the DC—DC converter drops, which is problematic.

The purpose of the present invention is to solve the aforementioned problems of the prior art by presenting a DC—DC converter characterized by the fact that in the low-load state, it can prevent reverse current in the inductor, reduce undesirable electric power losses, and increase the conversion efficiency.

SUMMARY OF THE INVENTION

In order to realize the aforementioned purpose, the present invention provides a DC—DC converter characterized by the fact that it comprises the following parts: a first switching element connected between one terminal of a voltage source and one terminal of an inductive element; a second switching element connected between the aforementioned terminal of the aforementioned inductive element and reference potential; a third switching element connected between the other terminal of said inductive element and said reference potential; a fourth switching element connected between said other terminal of said inductive element and the output terminal; and a control means which, when said first through fourth switching elements are turned on/off at a prescribed timing, outputs a voltage corresponding to said source voltage to said output terminal, and which turns on said second and third switching elements in the standby mode.

Also, according to the present invention, the following scheme is preferred: said control means has a current detecting means that detects the current through said inductive element, and turns on said second and third switching elements corresponding to the detection result of said current detecting means. When the current in said inductive element is nearly zero, said control means turns off said fourth switching element and turns on said second and third switching elements. In this way, it is possible to keep each end of the inductive element at the same potential, to eliminate changes in the inductor current, and to reduce the undesirable electric power losses. Also, in this case, it is possible to prevent ringing caused by the inductive element and the parasitic capacitance, and to lower the noise level.

Also, in the present invention, the following scheme is preferred: said control means enters first, second and third operating states repeatedly; in said first operating state, said first and third switching elements are turned on, and said second and fourth switching elements are turned off, in said second operating state, said first and third switching elements are turned off, and said second and fourth switching elements are turned on; and, in said third operating state, said first and fourth switching element are turned off, and said second and third switching elements are turned on.

Also, in the present invention, the following scheme is preferred: said control means enters first, second and third operating states repeatedly; in said first operating state, said first and fourth switching elements are turned on, and said second and third switching elements are turned off; in said second operating state, said first and third switching elements are turned off, and said second and fourth switching elements are turned on; and, in said third operating state, said first and fourth switching element are turned off, and said second and third switching elements are turned on.

Also, in the present invention, the following scheme is preferred: said control means enters first, second and third operating states repeatedly; in said first operating state, said first and third switching elements are turned on, and said second and fourth switching elements are turned off; in said second operating state, said first and fourth switching elements are turned on, and said second and third switching elements are turned off; and, in said third operating state, said first and fourth switching element are turned off, and said second and third switching elements are turned on.

In addition, according to the present invention, it is preferred that said first, second, third and fourth switching elements be made up of MOS transistors, and that a body diode be formed between the source and drain of each of said MOS transistors.

In addition, according to the present invention, it is preferred that when current through said inductive element is nearly zero, said control means turns on either of said second and third switching elements.

In addition, according to the present invention, the following scheme is preferred: it has a driver for supplying a switching control signal to the gate of each of the MOS transistors that form said first and fourth switching elements; said driver has a diode and a capacitor connected in series between the terminal for power source voltage supply and one terminal of said inductive element, and a buffer which has its power supply terminal connected to the connection point between said diode and capacitor, its reference voltage terminal connected to one terminal of said inductive element, its input terminal for receiving the control signal from said controller input, and its output terminal supplying said switch control signal to the gate of the MOS transistor of the control object.

The present invention also provides a type of controller characterized by the following facts: the controller is used to control said first, second, third and fourth switching elements of said DC—DC converter, which has an inductive element, a first switching element connected between a first power source terminal and one terminal of said inductive element; a second switching element connected between a second power source element and said terminal of said inductive element, a third switching element connected between said second power source terminal and the other terminal of said inductive element, a fourth switching element connected between a voltage output terminal and said other terminal of said inductive element, and a capacitive element connected to said voltage output terminal; wherein the operation of the controller is such that when said first and fourth switching elements are off, said second and third switching elements are turned on.

According to the present invention, it is preferred that it have a current detecting circuit that detects the current flowing through said inductive element, and operates such that when the current flowing through said inductive element is zero, said second and third switching elements are turned on.

In addition, according to the present invention, it is preferred that when said current detecting circuit detects that the current flowing through said inductive element is zero, the controller turns said first and fourth switching elements off and turns said second and third switching elements on.

REFERENCE NUMERALS AND SYMBOLS AS SHOWN IN THE DRAWINGS

S1, S2, S3, S4 represent a switch, L1 an inductor, 10 a switching controller, 20 a driver, 22 a diode, 24 a capacitor, 26 a buffer, $V_{in}$ a power source voltage, $V_{out}$ an output voltage, and $C_{out}$ a load capacitor.

DETAILED DESCRIPTION OF PREFERRED EMBODIMENTS

Figure 1:
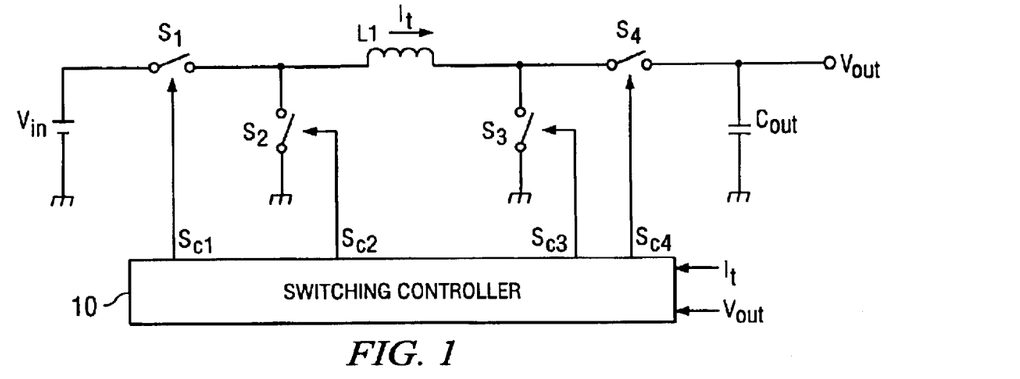
FIG. 1 is a diagram illustrating the constitution of an embodiment of the DC—DC converter of the present invention.

FIG. 1 is a diagram illustrating the constitution in an embodiment of the DC—DC converter in the present invention.

As shown in this figure, the DC—DC converter in this embodiment is composed of switches S1, S2, S3, S4, inductor L1, load capacitor C1, and switching controller 10.

Switching controller 10 detects current $I_L$ of inductor L1 and output voltage $V_{out}$. Corresponding to the detection result, switches S1, S2, S3 and S4 are controlled to turn on/off so that output voltage $V_{out}$ is kept at the desired level.

Switching controller 10 of this embodiment has a current detecting means for detecting current $I_L$ through inductor L1, and a voltage detecting means (not shown in the figure) for detecting output voltage $V_{out}$.

The voltage detecting means detects output voltage $V_{out}$, and, corresponding to the detection result, switching control means 10 appropriately switches switches S1–S4 so that the energy is stored in inductor L1, or so that the energy stored in inductor L1 is released to the load circuit, and the desired output voltage $V_{out}$, is supplied to the load circuit.

Also, when the current detecting means detects that current $I_L$ flowing through inductor L1 is nearly zero, switching controller 10 turns on both switches S2 and S3, that is, it connects both ends of inductor L1 to ground. As a result, it is possible to prevent ringing of the output.

The voltage detecting means for detecting output voltage $V_{out}$ and the current detecting means for detecting current $I_L$ that flows through inductor L1 can be realized using the conventional technology.

The DC—DC converters of this embodiment can be classified into the boost/buck type, the buck type and the boost type according to the level of output voltage $V_{out}$ with respect to the supplied power source voltage $V_{in}$. In the following, the operations of said DC—DC converters will be explained.

Boost-buck DC—DC Converter

Figure 2A:
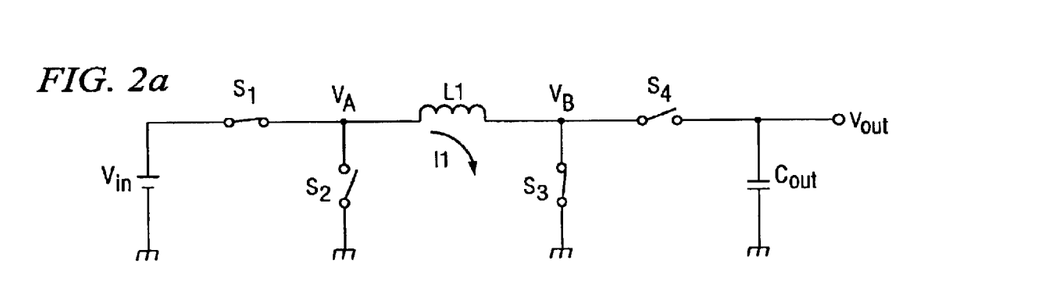
FIG. 2 is a diagram illustrating an example of the operation of a boost/buck DC—DC converter.
Figure 2B:
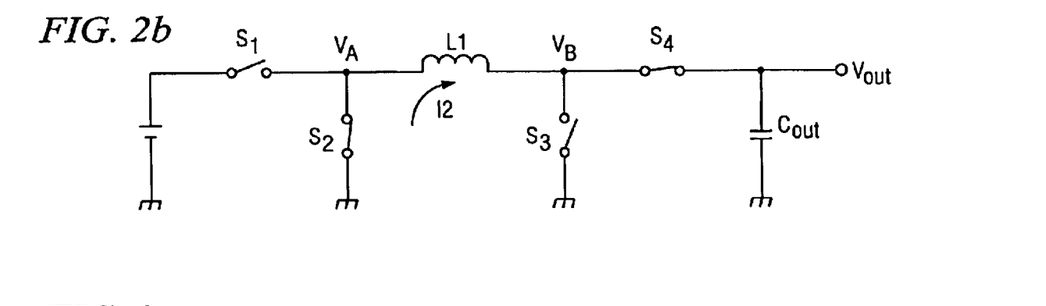
Figure 2C:
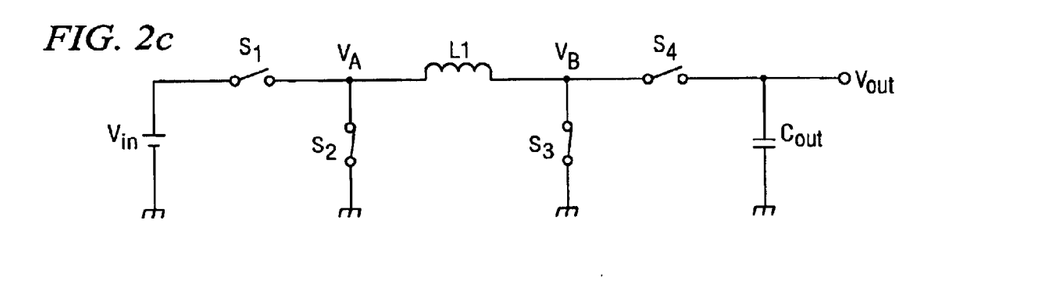

FIG. 2 is a diagram illustrating an example of the operation of a boost/buck DC—DC converter. The boost/buck DC—DC converter has three operating states, state 1, state 2, and state 3. FIGS. 2(a), (b), (c) show the on/off states of switches S1–S4 and the current through inductor L1 in said respective operating states.

As shown in FIG. 2(a), in state 1, switches S1 and S3 are controlled to be on, and switches S2 and S4 are off. Thus, as power source voltage $V_{in}$ is applied across inductor L1, current I1 through inductor L1 rises at a rate of $V_{in}/L$ depending on power source voltage $V_{in}$ and inductance L of inductor L1. That is, in state 1, the energy supplied from the power source is stored in inductor L1.

Then, in state 2, by means of switching controller 10, switches S1 and S3 are controlled to turn off, and switches S2 and S4 are controlled to turn on. In this case, the energy stored in inductor L1 is released to the load side. That is, by means of the output current of inductor L1, load capacitor $C_{out}$ is charged, and voltage $V_{out}$ is applied to the output terminal.

In state 2, because output voltage $V_{out}$ is applied across inductor L1, current I2 of inductor L1 falls at a rate of $V_{out}/L$. Then, after a prescribed time, current I2 through inductor L1 becomes nearly zero.

When it is detected that the current in inductor L1 is nearly zero, switching controller 10 turns off switches S1 and S4 and turns on switches S2 and S3. Here, the DC—DC converter is in operating state 3.

In state 3, inductor L1 is electrically isolated from the load circuit. In this case, the charge stored on load capacitor $C_{out}$ is slowly released to the load circuit, and output voltage $V_{out}$ falls. Also, in the low-load state, the current supplied to the load decreases, and output voltage $V_{out}$ is kept at a nearly prescribed voltage by means of load capacitor $C_{out}$.

In state 3, because both switches S2 and S3 are on, the two ends of inductor L1 are short circuited to ground potential. In addition, switches S2 and S3 are turned on when the current of inductor L1 becomes nearly zero. Consequently, it is possible to prevent the generation of reverse current in inductor L1, and it is possible to prevent the generation of ringing noise in output voltage $V_{out}$.

FIG. 3 shows the waveforms of the inductor current and output voltage of said boost/buck DC—DC converter.

Figure 3A:
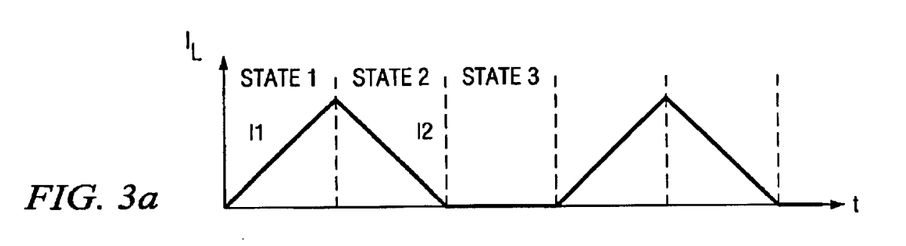
FIG. 3 is waveform diagram illustrating the waveforms of the inductor current and output voltage of the boost/buck DC—DC converter.
Figure 3B:
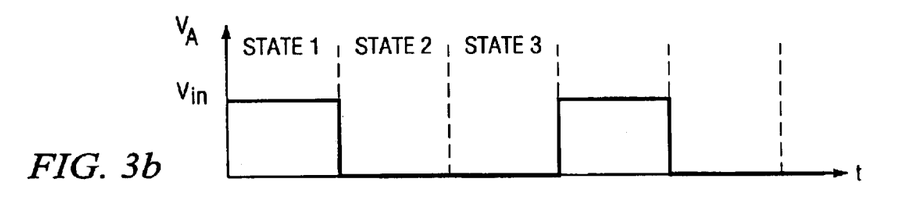
Figure 3C:
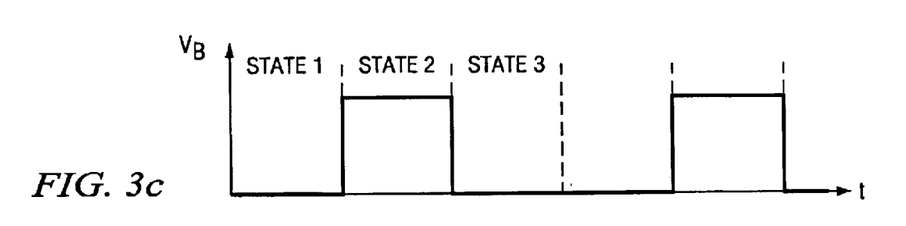
Figure 3D:
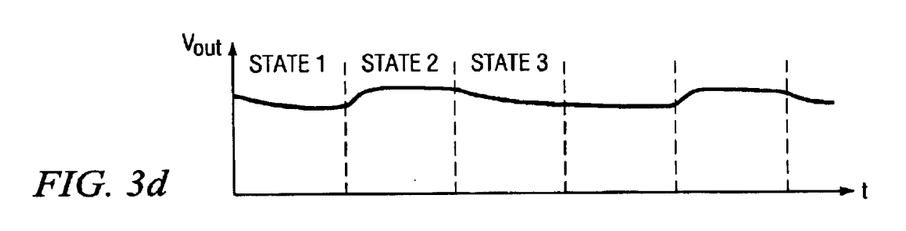

FIG. 3(a) is a diagram illustrating the inductance current. FIG. 3(b) illustrates the waveform of voltage $V_A$ at the connection point between switch S1 and inductor L1 in the circuit diagram shown in FIG. 2. FIG. 3(c) illustrates the waveform of voltage $V_B$ at the connection point between switch S4 and inductor L1. In addition, FIG. 3(d) illustrates the waveform of output voltage $V_{out}$.

As shown in FIG. 3(a), in state 1, the energy supplied from the power source is stored in inductor L1. Here, inductor current I1 rises at a rate $V_{in}/L$. As shown in FIG. 3(b), in state 1, voltage $V_A$ is held at power source voltage $V_{in}$, and voltage $V_B$ is held at ground potential (0V).

Also, in state 1, no current is supplied from inductor L1 to the load side, and output voltage $V_{out}$ held by load capacitor $C_{out}$ is supplied to the load circuit.

Then, in state 2, the energy stored in inductor L1 is released to the load side. In this case, current I2 in inductor L1 is output to the load circuit. Consequently, load capacitor $C_{out}$ is charged, and output voltage $V_{out}$ is kept at a prescribed level.

As shown in FIG. 3(b), in state 2, voltage $V_A$ is kept at ground potential, and voltage $V_B$ is kept at a nearly constant level. Also, in state 2, voltage $V_B$ is equal to output voltage $V_B$ of the DC—DC converter.

In state 2, switching controller 10 detects the current value of the inductor, and, when the current value becomes nearly zero, switch S3 is turned on, and switch S4 is turned off. That is, by means of switching of switches S1–S4, switches S1 and S4 are kept off, and switches S2 and S3 are kept on. As a result, both ends of inductor L1 are short-circuited to ground. Also, inductor L1 is electrically isolated from the load circuit. Consequently, the generation of reverse current in inductor L1 and the generation of ringing noise is prevented. In addition, depending on load conditions, a transition from state 2 to state 1 may take place without passing through state 3.

In the DC—DC converter of this embodiment, in accordance with power source voltage $V_{in}$, load current, etc., switching controller 10 appropriately controls the time ratio of state 1, state 2 and state 3, and controls output voltage $V_{out}$ to the desired level. As a result, it is possible to generate an output voltage that is either greater than power source voltage $V_{in}$, or lower than power source voltage $V_{in}$. That is, the DC—DC converter has both step-up and step-down functions. Also, by detecting the current through inductor L1 and controlling the switches in accordance with the detection result, it is possible to prevent generation of reverse current through inductor L1 and to prevent generation of ringing noise.

Buck DC—DC Converter

Figure 4A:
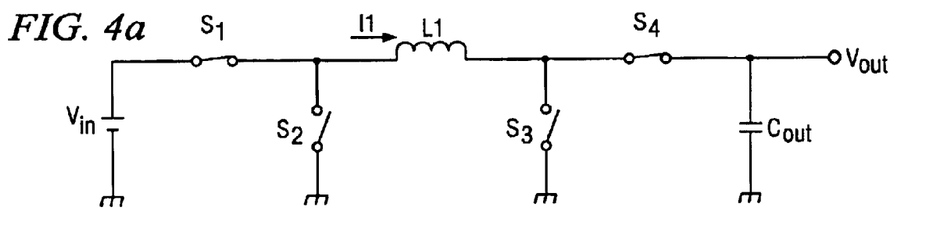
FIG. 4 is a diagram illustrating an example of operation of a buck DC—DC converter.
Figure 4B:
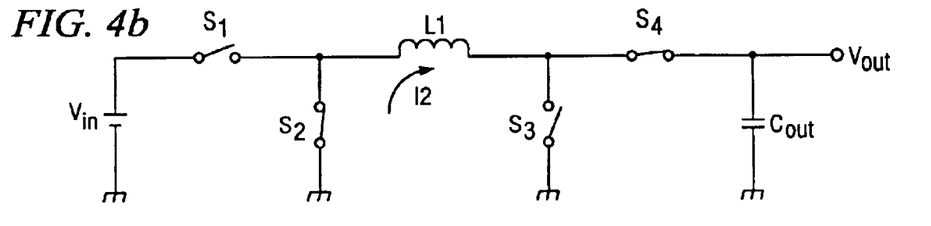
Figure 4C:
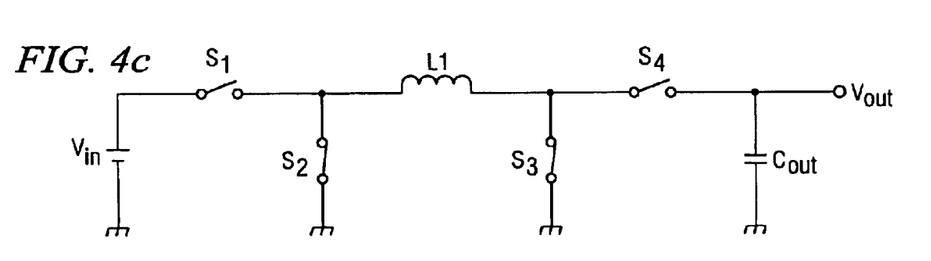

FIG. 4 is a diagram illustrating an example of operation of a buck DC—DC converter. As shown in the figure, the buck DC—DC converter has three operating states: state 1, state 2 and state 3. FIGS. 4(a), (b) and (c) illustrate the on/off states of switches S1–S4 and the current through inductor L1 in the respective states.

As shown in FIG. 4(a), in state 1, switches S1 and S4 are controlled to turn on, and switches S2 and S3 are off.

Consequently, a voltage corresponding to the difference between power source voltage $V_{in}$ and output voltage $V_{out}$, $(V_{out}-V_{in})$, is applied across inductor L1. Consequently, current I1 through inductor L1 rises at a rate of $(V_{out}-V_{in})/L$ as a function of the voltage difference $(V_{out}-V_{in})$ and inductance L of inductor L1.

In this way, in state 1, the energy supplied from the power source is stored in inductor L1. Also, during state 1, current is supplied from the power source to the load circuit.

Then, in state 2, by means of switching controller 10, switches S1 and S3 are controlled to turn off, and switched S2 and S4 are controlled to turn on. In this case, the energy stored in inductor L1 is released to the load side. That is, by means of the output current of inductor L1, load capacitor $C_{out}$ is charged, and voltage $V_{out}$ is applied to the output terminal.

In state 2, as output voltage $V_{out}$, is applied across inductor L1, current I2 through inductor L1 falls at a rate of $V_{out}/L$. In the low-load state or the like, depending on the load condition, current I2 in inductor L1 may be zero.

When it is detected that the current in inductor L1 becomes nearly zero, switching controller 10 turns off switches S1 and S4, and turns on switches S2 and S3. In this case, the DC—DC converter is in operating state 3. Also, in the full-load state, a transition may occur from state 2 to state 1 instead of state 2 to state 3.

In state 3, inductor L1 is electrically isolated from the load circuit. In this case, the charge stored in load capacitor $C_{out}$ is slowly released to the load circuit, and output voltage $V_{out}$ falls. In addition, in the low-load state, the current supplied to the load is small, and, by means of load capacitor $C_{out}$, output voltage $V_{out}$ is kept at nearly a prescribed constant voltage.

As explained above, in state 3, both switches S2 and S3 are on. Consequently, both ends of inductor L1 are short-circuited to ground, so that the generation of ringing noise can be prevented. In addition, because the switches S2 and S3 are turned on when the current through inductor L1 is nearly zero, it is possible to prevent the generation of reverse current through inductor L1.

Boost DC—DC Converter

Figure 5A:
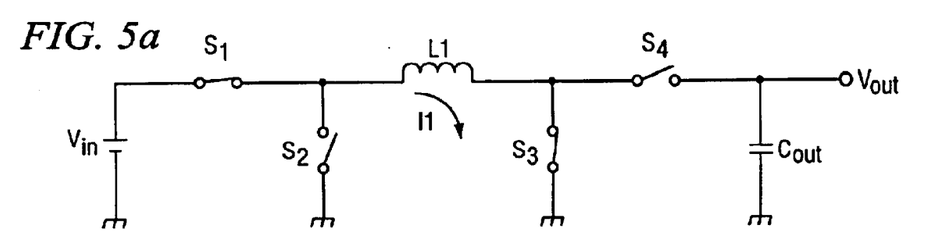
FIG. 5 is a diagram illustrating an example of operation of a boost DC—DC converter.
Figure 5B:
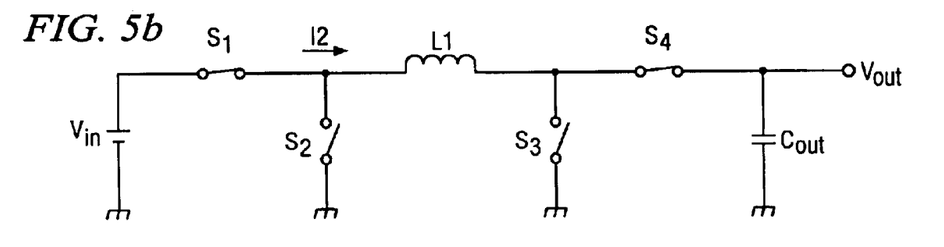
Figure 5C:
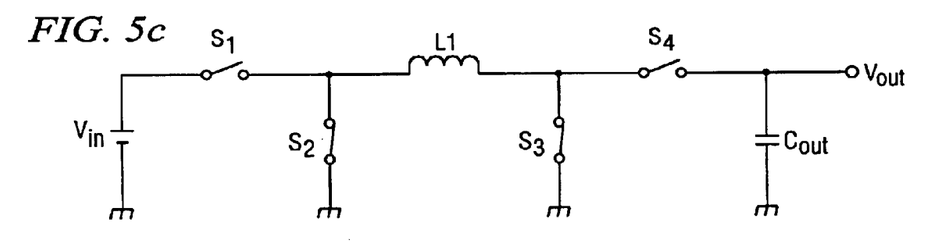

FIG. 5 is a diagram illustrating an example of the operation of a boost DC—DC converter. As shown in the figure, the boost DC—DC converter has three operating states: state 1, state 2 and state 3. FIGS. 5(a), (b) and (c) illustrate the on/off states of switches S1–S4 and the current through inductor L1 for the respective states.

As shown in FIG. 5(a), in state 1, switches S1 and S3 are controlled to turn on, and switches S2 and S4 are to turn off. Consequently, power source voltage $V_{in}$ is applied across inductor L1. Thus, current I1 through inductor L1 rises at a rate of $V_{in}/L$ as a function of power source voltage $V_{in}$ and inductance L of inductor L1.

In this way, in state 1, the energy supplied from the power source is stored in inductor L1.

Then, in state 2, by means of switching controller 10, switches 21 and S3 are controlled to turn off, and switches S1 and S4 are controlled to turn on. In this case, the energy stored in inductor L1 and the energy supplied from the power source are released to the load side. That is, by means of the output current of inductor L1, load capacitor $C_{out}$ is charged, and voltage $V_{out}$ is applied to the output terminal.

Also, in state 2, because power source voltage $V_{in}$ and the voltage across inductor L1 are applied at the same time to the load circuit, output voltage $V_{out}$ supplied to the load circuit is higher than power source voltage $V_{in}$.

In state 2, since a voltage corresponding to the difference between power source voltage $V_{in}$ and output voltage $V_{out}$, $(V_{out}-V_{in})$, is applied across inductor L1, current I2 through inductor L1 falls at a rate of $(V_{out}-V_{in})/L$. In the low-load state or the like, depending on the load conditions, current I2 through inductor L1 may be zero.

When it is detected that the current in inductor L1 is nearly zero, switching controller 10 turns off switches S1 and S4 and turns on switches S2 and S3. In this case, the DC—DC converter is in operating state 3.

In state 3, inductor L1 is electrically isolated from the load circuit. In this case, the charge stored on load capacitor $C_{out}$ is slowly released to the load circuit, and output voltage $V_{out}$ falls. In addition, in the low-load state, the current supplied to the load is small, and, by means of load capacitor $C_{out}$, output voltage $V_{out}$ is kept at nearly a prescribed constant voltage.

As explained above, in state 3, both switches S2 and S3 are on. Consequently, both ends of inductor L1 are short-circuited to ground, so that the generation of ringing noise can be prevented. In addition, because the switches S1–S4 are turned on when the current through inductor L1 is nearly zero, it is possible to prevent the generation of reverse current in inductor L1.

Specific Circuit Example 1 The operation of the boost/buck DC—DC converter, the buck DC—DC converter, and the boost DC—DC converter of this embodiment was explained above. The specific circuit constitution of the DC—DC converter of this embodiment will be explained below.

Figure 6:
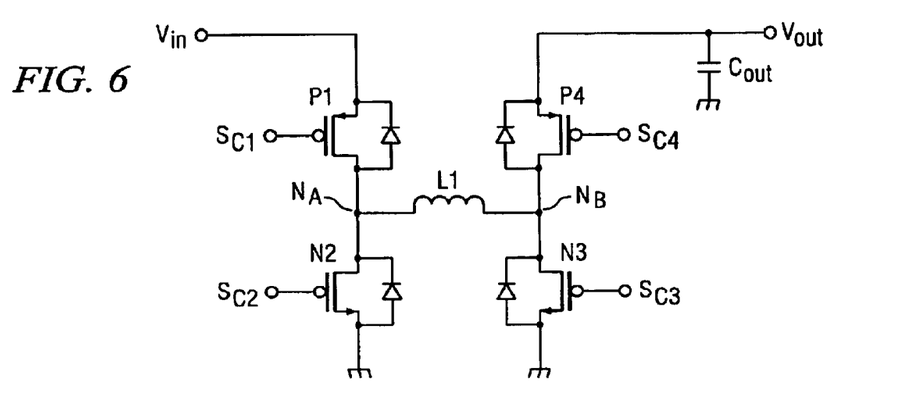
FIG. 6 is a circuit diagram illustrating a specific example of the constitution of the DC—DC converter in this embodiment.

FIG. 6 is a circuit diagram illustrating a specific example of the DC—DC converter of this embodiment. In FIG. 6, switching controller 10 is not shown.

As shown in the figure, the DC—DC converter of this embodiment comprises inductor L1, p-channel MOS transistors P1 and P4, n-channel MOS transistors N2 and N3, and load capacitor $C_{out}$. Also, p-channel MOS transistors P1 and P4 correspond to switches S1 and S4 shown in FIG. 1, and n-channel MOS transistors N2 and N3 correspond to switches S2 and S3 shown in FIG. 1, respectively.

As shown in FIG. 6, the source of transistor P1 is connected to the power source terminal for supplying power source voltage $V_{in}$. Its drain is connected to one terminal $N_A$ of inductor L1. Switch control signal $S_{c1}$ is input to the gate of transistor P1.

The source of transistor N2 is grounded, and its drain is connected to terminal $N_A$ of inductor L1. Switch control signal $S_{c2}$ is input to the gate of transistor N2.

The drain of transistor P4 is connected to output terminal $T_{out}$, and its source is connected to the other terminal $N_B$ of inductor L1. Switch control signal $S_{c4}$ is input to the gate of transistor P4.

The source of transistor N3 is grounded, and its drain is connected to terminal $N_D$ of inductor L1. Switch control signal $S_{c3}$ is input to the gate of transistor N3.

Also, as shown in FIG. 6, body diodes D1–D4 are formed in the respective transistors.

Transistors P1, N2, N3 and P4 are controlled to turn on/off as a function of switching control signals $S_{c1}$–$S_{c4}$ which are input to the gates of the respective transistors.

Said switch control signals $S_{c1}$–$S_{c4}$ are supplied from switch controller 10 (not shown in FIG. 6). As shown in FIG. 1, switching controller 10 detects current $I_L$ through inductor L1 and output voltage $V_{out}$, and, corresponding to the detection result, appropriately outputs switch control signals $S_{c1}$–$S_{c4}$.

In the DC—DC converter shown in FIG. 6, since switching controller 10 appropriately supplies switch control signals $S_{c1}$–$S_{c4}$, it can realize any of said types of DC—DC converter, that is, boost/buck converter, a buck converter, and a boost converter.

As shown in FIG. 6, in the aforementioned DC—DC converter, in said state 3, by means of switch control signals $S_{c2}$ and $S_{c3}$ output from switching controller 10, both transistors N2 and N3 are controlled to turn on. As a result, both ends of inductor L1 are grounded, and the generation of ringing noise can be prevented.

On the other hand, in the example of circuit shown in FIG. 6, although only one transistors N2 or N3 is on, it is still possible to prevent ringing noise. As shown in FIG. 6, in transistors P1, N2, N3 and P4, body diodes D1–D4 are formed, respectively. When any one of transistors N2 and N3 is turned on by means of these body diodes, the ringing noise generated at the two ends of inductor L1 is cut off by the body diodes, so that the ringing noise can be suppressed. Also, in this case, although the ringing voltage cannot be completely removed, and a portion corresponding to the forward on voltage of the body diode is left, it is nevertheless suppressed to a very low level.

Specific Circuit Example 2

Figure 7:
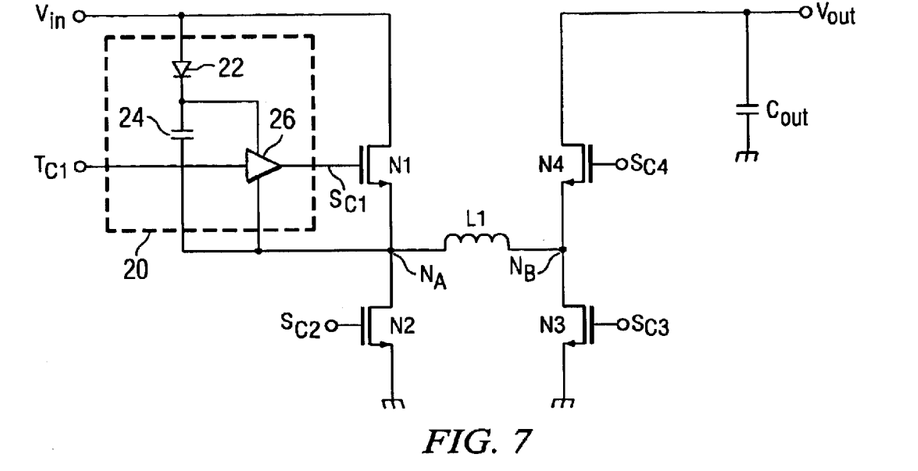
FIG. 7 is a circuit diagram illustrating another specific example of the constitution of the DC—DC converter in this embodiment.

FIG. 7 is a circuit diagram illustrating another circuit example of the DC—DC converter of the present embodiment. As shown in the figure, the DC—DC converter of this example is composed of n-channel. MOS transistors N1–N4, which correspond to switches S1–S4. Also, FIG. 7 illustrates an example of the driver that supplies switch control signal $S_{c1}$ to the gate of n-channel transistor N1 corresponding to switch S1.

As shown in FIG. 7, transistor N1 is connected between power source voltage $V_{in}$ and one terminal $N_A$ of inductor L1, and switch control signal $S_{c1}$ is applied to its gate. Transistor N2 is connected between terminal $N_A$ (hereinafter to be referred to as node $N_A$) of inductor L1 and ground potential, and its gate is controlled by switch control signal $S_{c2}$. Transistor N3 is connected between the output terminal and the other terminal $N_B$ of inductor L1, and switch control signal $S_{c3}$ is applied to its gate. Transistor N4 is connected between terminal $N_B$ (hereinafter referred to as node $N_B$) of inductor L1 and ground potential, and switch control signal $S_{c4}$ is applied to its gate.

By means of switch control signals $S_{c1}$–$S_{s4}$ applied to their gates, transistors N1–N4 are controlled to turn on/off, respectively.

FIG. 7 illustrates an example of the constitution of driver 20, which supplies switch control signal $S_{c1}$ to the gate of transistor N1. As shown in the figure, driver 20 comprises diode 22, capacitor 24 and buffer 26.

Diode 22 and capacitor 24 are both connected between the power source terminal for supplying of power source voltage $V_{in}$ and node $N_A$. Also, the anode of diode 22 is connected to the power source terminal, and its cathode is connected to the other terminal of capacitor 24.

The input terminal of buffer 26 is connected to input terminal $T_{c1}$ of the control signal, and its output terminal is connected to the gate of transistor N1. The power source voltage supply terminal of buffer 26 is connected to the connecting point between diode 22 and capacitor 24, and the reference potential supply terminal is connected to node $N_A$. A control signal from switching controller 10 (not shown in the figure) is input to input terminal $T_{c1}$.

In said driver 20, corresponding to the control signal from switching controller 10, switch control signal $S_{c1}$ is supplied from buffer 26 at the gate of transistor N1. As a result, transistor N1 is controlled to turn on/off.

In the circuit shown in FIG. 7, transistors N1, N2, N3, N4 are controlled in the same way as for transistors P1, N2, N3, P4 in FIG. 6.

Diode 22 and capacitor 24 form a bootstrap circuit. The charge stored on capacitor 24 drives buffer 26. When transistor N2 and/or N3 is on, the potential at both ends $N_A$ and $N_B$ of inductor L1 is kept nearly at GND level. Consequently, capacitor 24 is charged from power source voltage $V_{in}$ through diode 22, and a voltage for driving buffer 26 is held on capacitor 24. Then, when transistors N2, N3 turn on, and transistor N1 turns off, the charge stored on capacitor 24 drives buffer 26.

When the bootstrap circuit is used, it is necessary to ensure that the voltage on the capacitor, which is used as a floating power supply, is at the appropriate level. However, according to the constitution of the present invention, there is no leakage of the charge from capacitor 24.

FIG. 7 illustrates an example of circuit of driver 20 that supplies switch control signal $S_{c1}$ to the gate of transistor N1. However, one may also set a driver of the same structure in transistor N4 to supply switch control signal $S_{c4}$.

By means of driver 20 shown in FIG. 7, when node $N_A$ or node $N_B$ is at ground potential, capacitor 24 is charged by power source voltage $V_{in}$ through diode 22. When node $N_A$ or node $N_B$ is switched to the floating state, the voltage on capacitor 24 is supplied as a power source voltage to buffer 26. Consequently, regardless of the potential level at node $N_A$ or node $N_B$ in the floating state, driver 26 can operate reliably, it is possible to supply switch control signal $S_{sc1}$ or $S_{c4}$ to the gate of transistor N1 or N4, and it is possible to control the switching of the switches at high speed. Also, in FIG. 7, diode 22 is connected to power source voltage $V_{in}$. However, one may also adopt another appropriate constitution for connection to the power source.

As explained above, in this embodiment, in the DC—DC converter composed of switches S1–S4 and inductor L1, by turning switches S1–S4 on/off with a prescribed timing, the energy supplied from power source voltage $V_{in}$ is stored in inductor L1, and the energy stored in inductor L1 is then released to the load side. By controlling the timing for storing and releasing the energy, it is possible to supply the desired output voltage $V_{out}$ to the load side. Also, the current through inductor L1 is detected, and the switches are set in accordance with the detection result; in the standby low-load state, at least one terminal of inductor L1 is grounded. Consequently, it is possible to suppress the generation of ringing noise, and it is possible to supply the desired stable voltage $V_{out}$ to the load circuit independently of power source voltage $V_{in}$.

Also, by using MOS transistors to form switches S1–S4, and turning on/off said MOS transistors by means of a switching controller, it is a simple operation to realize the switching of the switches. In addition, by means of the body diodes of the MOS transistors or the MOS transistors themselves, it is possible to suppress the generation of ringing noise.

As explained above, by appropriately controlling the switching of the switching elements, the DC—DC converter of the present invention can be used to supply the desired stable voltage to a load circuit independently of the supplied power source voltage.

Also, according to the present invention, by detecting the current in the inductor and controlling the timing for switching of the switching elements according to the detection result so as to hold the inductor at ground potential at the time that the current in the inductor is nearly zero, it is possible to suppress the generation of reverse current through the inductor and to reduce ringing noise. Also, when the inductor current becomes nearly zero, the inductor is cut off from the load circuit, and the switching operation is stopped. As a result, it is possible to reduce the power consumption, and to increase the efficiency of voltage conversion. This is also an advantage.

In addition, by using MOS transistors to form the switching elements of the DC—DC converter of the present invention, it is easy to realize the switching of the switches by turning the MOS transistors on/off. Also, by means of the body diodes of the MOS transistors, it is possible to suppress the ringing noise of the inductor.

Also, according to the present invention, in the driver for supplying the control signal to the gate of MOS transistor, the diode and capacitor are used to supply the voltage held by the capacitor as a power source voltage to the buffer that outputs the switch control signal. As a result, the switching of the switches can be performed at high speed.

In addition, when high-side MOS transistor driving is carried out using a bootstrap circuit, it is possible to always maintain a stable voltage on the capacitor of the bootstrap circuit.

What is claimed is:

1. A DC—DC converter comprising:
   a first switching element connected between one terminal of a voltage source and one terminal of an inductive element;
   a second switching element connected between the aforementioned terminal of the aforementioned inductive element and reference potential;
   a third switching element connected between the other terminal of said inductive element and said reference potential;
   a fourth switching element connected between said other terminal of said inductive element and the output terminal;
   and a control means which, when said first through fourth switching elements are turned on/off at a prescribed timing, outputs a voltage corresponding to said source voltage to said output terminal, and which turns on said second and third switching elements in the standby mode.

2. The DC—DC converter of claim 1 in which:
   said control means has a current detecting means that detects the current through said inductive element and turns on said second and third switching elements corresponding to the detection result of said current detecting means.

3. The DC—DC converter of claim 2 in which:
   when the current in said inductive element is nearly zero, said control means turns off said fourth switching element, and turns on said second and third switching elements.

4. The DC—DC converter of claim 1 in which:
   said control means enters first, second and third operation states repeatedly;
   in said first operating state, said first and third switching elements are turned on, and said second and fourth switching elements are turned off;
   in said second operating state, said first and third switching elements are turned off, and said second and fourth switching elements are turned on;
   and, in said third operating state, said first and fourth switching element are turned off, and said second and third switching elements are turned on.

5. The DC—DC converter of claim 1 in which:
   said control means enters a first, second and third operating states repeatedly;
   in said first operating state, said first and fourth switching elements are turned on, and said second and third switching elements are turned off;
   in said second operating state, said first and third switching elements are turned off, and said second and fourth switching elements are turned on;
   and, in said third operating state, said first and fourth switching element are turned off, and said second and third switching elements are turned on.

6. The DC—DC converter of claim 1 in which:
   said control means enters first, second and third operating states repeatedly;
   in said first operating state, said first and third switching elements are turned on, and said second and fourth switching elements are turned off;
   in said second operating state, said first and fourth switching elements are turned on, and said second and third switching elements are turned off;
   and, in said third operating state, said first and fourth switching element are turned off, and said second and third switching elements are turned on.

7. The DC—DC converter of claim 1 in which:
   said first, second, third and fourth switching elements are MOS transistors, and a body diode is formed between the source and drain of each of said MOS transistors.

8. The DC—DC converter of claim 7 in which:
   when current in said inductive element is nearly zero, said control means turns on any one of said second and third switching elements.

9. The DC—DC converter of claim 7, further comprising:
   a driver for supplying switch control signal to the gate of each of the MOS transistors that form said first and fourth switching elements, said driver has a diode and a capacitor connected in series between the terminal for power source voltage supply and one terminal of said inductive element; and
   a buffer which has a power supply terminal connected to the connection point between said diode and capacitor, a reference voltage terminal connected to one terminal of said inductive element, a input terminal for receiving the control signal from said controller input, and an output terminal supplying said switch control signal to the gate of the MOS transistor of the control object.

* * * * *